RECORD HOLDER ADAPTER FOR AUTOMATIC RECORD CHANGERS

Original Filed April 29, 1965 2 Sheets-Sheet 1

INVENTOR.
ROBERT L. VAN ANTWERP
BY Otis A. Earl
ATTORNEY.

RECORD HOLDER ADAPTER FOR AUTOMATIC RECORD CHANGERS

Original Filed April 29, 1965 2 Sheets-Sheet 2

INVENTOR.
ROBERT L. VAN ANTWERP
BY [signature]
ATTORNEY.

United States Patent Office 3,414,270

Patented Dec. 3, 1968

3,414,270
RECORD HOLDER ADAPTER FOR AUTOMATIC RECORD CHANGERS

Robert L. Van Antwerp, Benton Harbor, Mich., assignor to Maestro Corporation, Stevensville, Mich., a corporation of Michigan Continuation of application Ser. No. 451,793, Apr. 29, 1965. This application Sept. 19, 1966, Ser. No. 586,916
5 Claims. (Cl. 274—10)

ABSTRACT OF THE DISCLOSURE

A record holder adapter comprising a one-piece member having an upright passage adapted to receive the record spindle therein. The adapter is provided with a first pair of substantially vertical walls adjacent the lower end thereof, to which is connected a second pair of substantially parallel inclined walls, on the upper end of which is a third pair of substantially parallel inclined walls. The intersection between the second and third walls on one side of the adapter defines a record support position substantially in the plane of the support shelf formed on the spindle. The intersection between the second and third edges on the other side of the adapter defines a shoulder positioned slightly above the record support position. The adapter is provided with a slot therein communicating with the passage adjacent the lower end of the adapter for permitting the adapter to pivot relative to the spindle.

This application is a continuation of applicant's copending application Ser. No. 451,793, filed Apr. 29, 1965, now abandoned.

This invention relates to improvements in record holder adapter for automatic record changers. The principal objects of this invention are:

First, to provide a simple one piece adapter for converting standard record holders or spindles of record changers to operate with 45 r.p.m. records having large holes.

Second, to provide a one piece adapter which will permit the existing record ejecting mechanism of a standard automatic record playing spindle to operate on 45 r.p.m. records placed in a stack on the adapter.

Third, to provide a record holding adapter of the type described that can be inexpensively molded in a single piece and operation.

Other objects and advantages of the invention will be apparent from a consideration of the following decription and claims. The drawings of which there are two sheets show a highly practical form of the adapter.

Figures 1, 2:
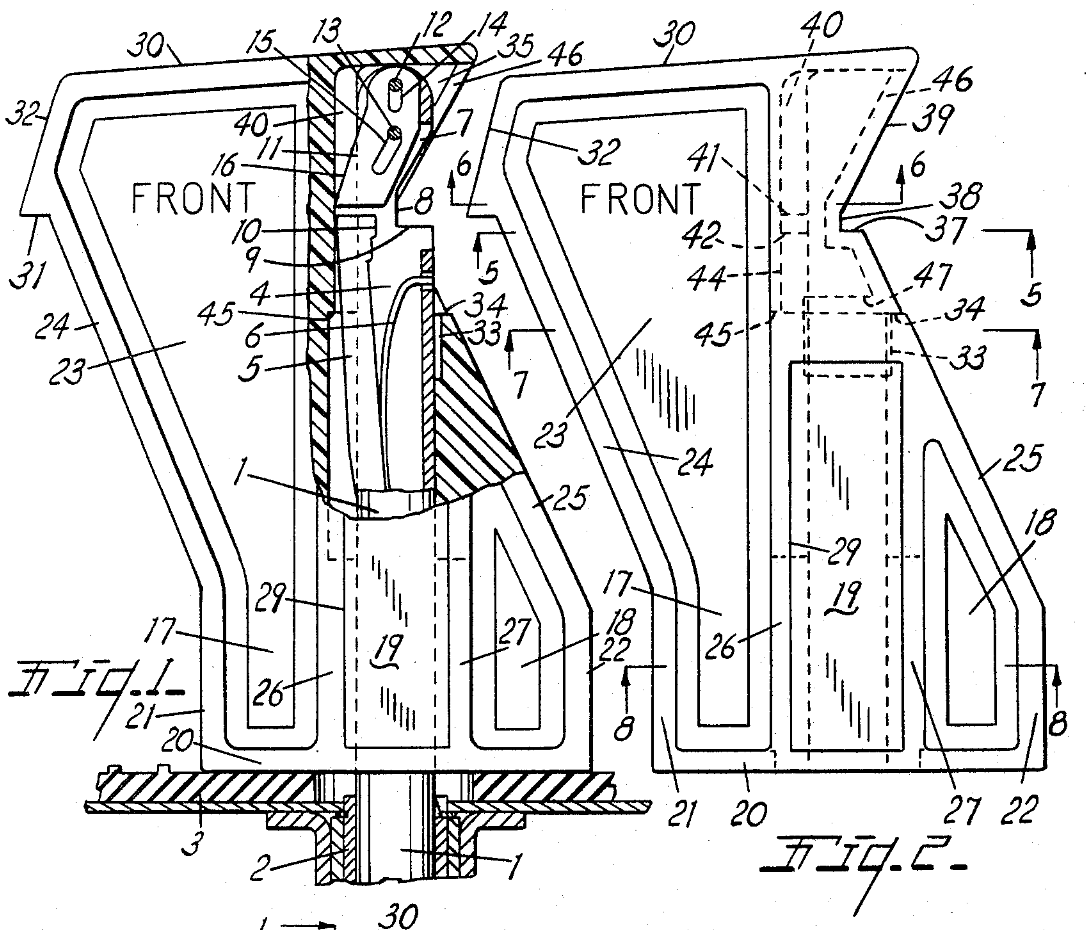
FIG. 1 is a fragmentary front side elevational view of the adapter in operative position on a standard or common type of automatic record changer spindle and turntable, portions of the adapter, spindle and turntable being broken away along the vertical axis of the spindle and the corresponding central plane of the adapter.
FIG. 2 is a front side elevational view of the adapter.
Figure 4:
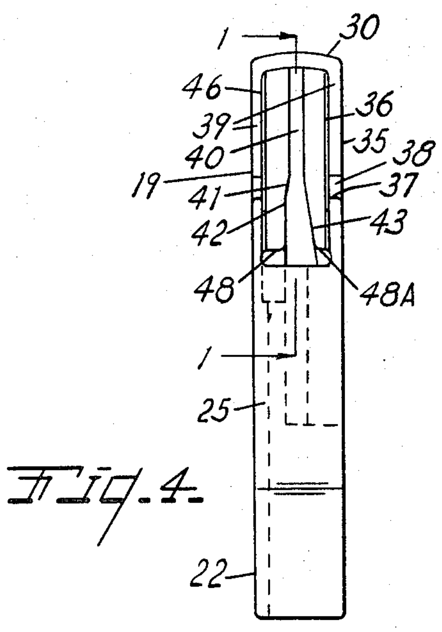
FIG. 4 is a right edge elevational view of the adapter.
Figure 3:
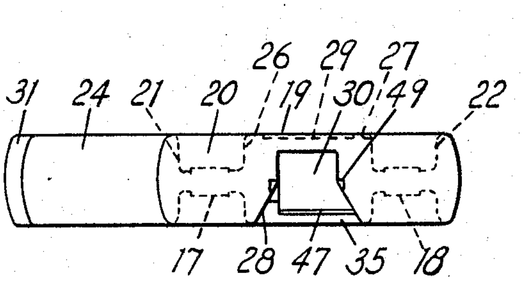
FIG. 3 is a bottom plan view of the adapter.

A common or more or less standard form of automatic record player has a stationary spindle 1 projected upwardly through a central bearing 2 of a rotatable turntable 3 as shown in FIG. 1. The spindle is slotted lengthwise over half of its diameter as at 4 to receive an upright ejector lever 5. The lever is pivoted for lateral rocking and limited vertical sliding in the slot by record changing mechanism (not shown) that is located below the structure shown in FIG. 1. A leaf spring 6 biases the ejector lever to the left in the slot. The spindle has its right face cut back laterally into the slot 4 as at 7 and vertically downwardly a short distance approximating the thickness of a record at 8 to a horizontal record supporting shelf 9. The shelf 9 is positioned opposite the upper end 10 of the lever so that the end of the lever projects into the central hole of the lower record of a stack of records on the spindle. When the lever is rocked to the right the upper end 10 engages the inside of the hole and pushes the bottom record off of the shelf from where the record falls to the turntable to be played. The next to the bottom record is prevented from being moved laterally by a restraining link 11, the lower end of which fits into the hole in the second record in aligned relation to the lower record. The link is restrained against lateral movement by pins 12 and 13 passed through slots 14 and 15 with the left edge 16 projecting to the left to guide records to the left and onto the shelf 9. Slot 15 is angled to permit the link to swing into the slot in the spindle should it be desired to lift a stack of records off of the shelf and the spindle. The foregoing structure is old and it is to this structure which the adapter of the invention is sized and arranged to adapt the record player for playing 45 r.p.m. records that have larger center holes than other records.

The adapter of the invention is an integral one piece part desirably molded of plastic. The adapter has an upright web-like lower left body portion 17 and an upright lower right web-like body portion 18 spaced equally on the right and left of a central flat wall 19. The wall is off-set forwardly to the plane of a bottom flange 20 and lower edge flanges 21 and 22. As appears from FIG. 8 the flanges 21 and 22 extend equally to the front and back of the web-like body portions. Above the lower body portions the left web widens laterally as at 23 within an overhanging extension 24 of flange 21. The right body portion 18 tapers to a point within the inclined flange 25 that is parallel to flange 24 and merges at the top with the central wall 19.

The central wall 19 is connected to the web-like body portions 17, 18 and 23 by laterally spaced transverse central flanges 26 and 27. At their lower ends and back sides, the flanges 26 and 27 have their inner opposed faces spaced with respect to the back side of the central wall to slidably receive the spindle 1 as is indicated by the dotted circle 1A. At their back sides the flanges 26 and 27 are beveled outwardly as at 28 to facilitate transverse swinging engagement with the lower end of the spindle. The central flange 27 merges with the inclined flange 25 on the front side but terminates with the right body portion 18 on the back above the beveled portion 28. The central flange 26 similarly terminates on the back side with the body portion 17 above the back bevel 28. On the front side, the central flange 26 which is coincident with the central wall 19 except for a decorative recess 29, extends to the top of the adapter and merges with a top flange 30 inclined downwardly slightly to the left.

At the left edge of the adapter the overhanging flange 24 has a downwardly facing overhanging shoulder 31 above which the flange inclines to the right as at 32 to the top flange 30. The junction of flanges 30 and 32 is smoothly rounded so that the edges of the holes of the records will slide easily thereover.

At the right edge of the adapter, the inclined flange 25 terminates in the center where it intersects the vertical slot formed by backside of central flange 27 and the coincident edge of the right web portion 18. There is a slight lateral and transverse enlargement at the back of the front wall and the opposed edges of the central flanges 26 and 27 at 33, the right edge of which intersects the inclined flange 25 in slightly laterally inwardly spaced relation to the outer side of the flange leaving a narrow upwardly facing shoulder 34 located at the top right hand edge of the enlargement 33. (See FIG. 1 and in reverse in FIG. 9.)

Figures 5, 6, 7, 8, 9:
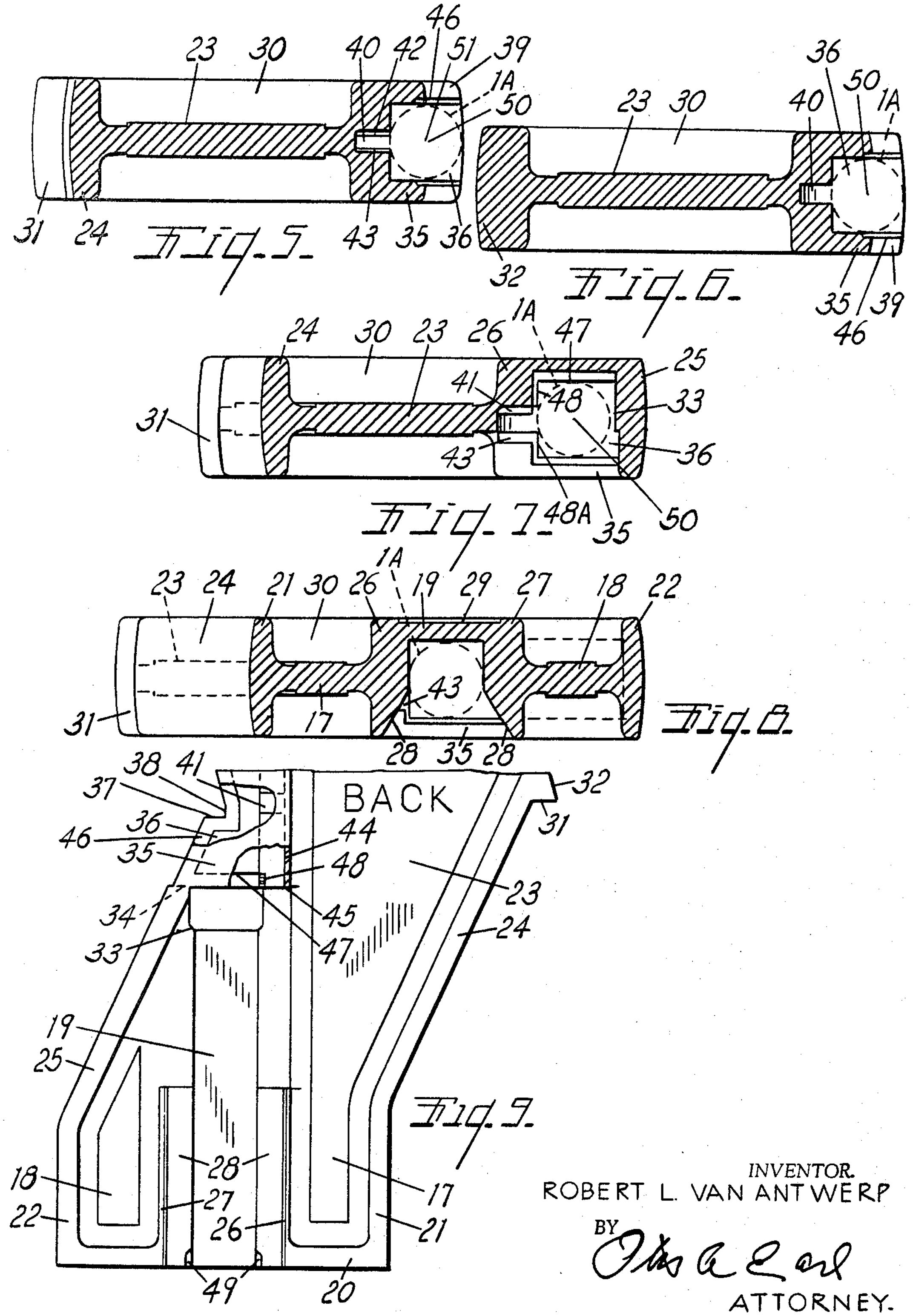
FIG. 5 is a cross sectional view of the adapter taken along the plane of the record supporting shelf at the line 5—5 in FIG. 2 and looking upwardly in the direction of the arrows.
FIG. 6 is a cross sectional view taken along the plane of the line 6—6 in FIG. 2 and looking in the direction of the arrows.
FIG. 7 is a cross sectional view taken along the plane of the line 7—7 in FIG. 2 and looking in the direction of the arrows.
FIG. 8 is a cross sectional view taken along the plane of the line 8—8 in FIG. 2 and looking in the direction of the arrows.
FIG. 9 is a fragmentary back elevational view of the lower portion of the adapter.

Above the shoulder 34, the front and back edges of the inclined flange 25 merge with and become part of the front central wall 19 and a back wall 35 that extends to the right as an integral extension of the back edge of central flange 26, above the horizontal plane of shoulder 34 to the top flange 30. The center of the inclined flange 25 and the connected part of the right web portion 18 being terminated at shoulder 34, the top of the front central wall 19 and the back wall are spaced transversely of the adapter leaving an opening 36 facing laterally to the right between the shoulder 34 and the top flange 30. Since the flange 25 is convex as shown in FIGS. 7 and 8 and since the center of this convex section is cut away or omitted, there appears to be a notch at the outer edge of shoulder 34 but this is due to the lesser lateral extent of the edges of opening 36. The corners, front and back of the walls 19 and 35 and the edges of flange 24 form smooth parallel guide edges sized to fit the holes in 45 r.p.m. records.

Just below the level of the shoulder 31, on the right edge of the adapter the walls 19 and 35 are notched inwardly in a record supporting shelf 37 that is in the plane of the shelf 9 of the spindle and extends laterally to the left to the same extent. This shelf 37 is below the shoulder 31 by a distance slightly greater than the thickness of a record to be sure that the bottom record of a stack may rest on shelf 37 and clear the shoulder 31. A short upright edge 38 extends from each side of the shelf to laterally outwardly overhanging edges 39 that extend to and connect with the top flange 30 in parallel relation to the left flange 32 at the upper end of the adapter.

The left central flange 26 and its connected web portion 23 are notched laterally to the left along the central plane of the adapter as at 40 to provide a slot to receive the restraining link 11. Just above the shelf 37, the front side of the notch tapers forwardly at 41 and downwardly at 42 in a continuation of the transversely inner side of the slot above the tapered lower end of the back side of flange 26. The opposite side of the slot tapers transversely backwardly at 43 to the plane of the bottom of the back wall providing a slightly wider upright slot receiving the upper end of the ejector lever 5. The base or lateral side of the slot extends downwardly at 44 to a laterally offset narrow shoulder 45 and continues downwardly to the exposed right edge of the left web to the top of the tapered portion of the central flange on the back side of the adapter. The opposed inner faces of the front and back walls 19 and 35 have laterally widened rabbeted edges 46 extending along their inclined edges and along the shelves 37 and laterally inwardly at 47 along the upper edges of the enlargement 33 in the spindle receiving slot. A shallow curved relief 48 and 48A extends from the left ends of the rabbeted grooves to the lower edges of sides 42 and 43 at the upper left edge of the enlargement to assist in the molding of the adapter by preventing material from entering into the enlargement. Narrow relief notches 49 at the bottom of the tapered flanges 26 and 27 at the back of the adapter similarly prevent flash material from entering the spindle groove at the bottom of the adapter. The parting plane of the main mold pieces is along the central axis of flanges 20 and 30.

The adapter can be molded in one integral piece. The sides carry the "front" and "back" designations molded thereon. The adapter slips easily over the spindle with the top of the spindle engaging the bottom of the top flange 30. The central wall 19 engages the front side of the spindle, while the right flange engages the right side of the spindle. The top back wall 35 locates the top of the adapter and the slot 40 provides room for movement of the standard record ejecting lever 5. The edges 32 and 39 locate the oversized holes of 45 r.p.m. records for feeding to and ejection by the lever. The adapter, in effect, provides a vertical spindle receiving hole without having an actual vertical bore and can be formed in a single molding operation.

The arrangement of the adapter parts permits its molding in a three piece mold in a single operation. Main front and back molds form the flanges and web-like body portions and the central wall 19 that define the lower portion of the spindle receiving slot while a laterally retractable mold element projects into the right edge of the main mold cavity to form the opening 36 and the back wall 35. The rabbeted edge grooves 46 and 47 are formed by suitable ribs or enlargements on the retractable mold to prevent flash of leakage of the material being molded into the spindle receiving groove. A similar projection on the end of the retractable mold forms the relief pockets 48 and 48A. The axis of the spindle opening indicated at 50 in FIG. 5 and as located by the inner surfaces of walls 19, 35 and laterally opposed edges of flanges 26 and 27 is located very slightly to the right of the arc defined by the upright edges 38 at the level of shelves 37, as is indicated by the closest point of this arc at 51. The widening of slot 40 below the bevel surfaces 41 and 43 permits slight transverse or front to back tilting of the adapter as it is slipped over the spindle and the projecting ends of the reject lever 5 and restraining link 11. The ends of the lever and link are guided to their final position in the narrow portion of the slot by the inclined surfaces 41 and 43.

The embodiments of the invention in which an exclusive property or privilege is claimed are defined as follows:

1. A record holding adapter for automatic record changing phonographs having a spindle with a record supporting notch in one side and an ejector lever swingable transversely across said notch comprising:

an integral molded one-piece body having an upright lower portion with first edges spaced to fit the holes in records to be played on the phonograph;

means defining a first slot formed in said one-piece body centrally of said first edges and sized to engage the front and sides of said spindle;

parallel inclined second edges on one side of said one-piece body extending from the top of said lower portion with said second edges being inclined toward said slot and terminating in spaced relation to said slot;

transversely spaced flanges on the front and back of said one-piece body extending from the upper ends of said second edges and thereabove and forming a laterally opening slot merging with the upper end of and constituting an extension of said first slot and sized to engage the front and back of said spindle;

said flanges having third edges extending laterally inwardly so as to define a support shelf intersecting said first slot, the third edges then being inclined outwardly above said support shelf;

inclined fourth edges on the side opposite said one side of said one-piece body extending parallel to said inclined second edges and to above said support shelf a distance slightly greater than the thickness of a record and spaced to fit the hole in the records;

a laterally outwardly and downwardly facing shoulder extending from the upper ends of said fourth edges;

oppositely inclined fifth edges extending from the outer edge of said shoulder parallel to said outwardly extending portions of said third edges;

a top on said one-piece body extending across the top of said laterally opening slot; and said first slot opening transversely of said body and being laterally widened on both sides and transversely deepened for a short distance approximately equal to the width of the slot at a position commencing at the lower edge of said flange on the back of said one-piece body and extending therebelow, and said transversely spaced flanges having internally rabbeted edges and transversely widened portions along the top of the widened portion of said first slot.

2. A record adapter as defined in claim 1 in which there is a transversely extending and laterally deepened relief along the juncture of the base of said laterally opening slot and the adjacent edge of said first slot.

3. A record holding adapter for a record changing phonograph having a spindle having a record support shelf and an ejector element for engaging the lowermost record at the support position of the spindle, comprising:

an integral molded one-piece body having an upright lower portion having an upwardly extending first sidewall having a first edge thereon;

said molded one-piece body having an intermediate portion extending upwardly from the upper end of said lower portion and having a second sidewall defining a second edge extending upwardly from the upper end of said first edge at an angle with respect to the vertical;

said molded one-piece body having an upper portion extending upwardly from the upper end of said intermediate portion and having third and fourth sidewalls respectively defining third and fourth edges which are spaced apart a distance so that they can be received within the central opening of a record having an enlarged central opening, there being defined a record support substantially at the intersection of said second and third edges with said record support being substantially in the horizontal plane containing said support shelf, and the lower end of said fourth edge being spaced upwardly from said record support a distance substantially equal to the thickness of a record;

said molded body having an upright passage therein for receiving said spindle, said passage opening at one side through said second and third sidewalls to the periphery of said adapter, the lower portion of said upright passage opening outwardly to the periphery of said adapter so as to define a vertical slot means for permitting swinging movement of said adapter relative to said spindle in a substantially vertical plane when said spindle has been at least partially inserted into said upright passage; and said upper portion of said molded one-piece body having a central web extending from adjacent the side opposite said one side of said passage toward said fourth edge, said web having at the end thereof adjacent said opening spaced-apart wall means defining said vertical slot therein, said slot communicating with said passage at the side opposite said one side thereof.

4. A record holding adapter for automatic record changing phonographs having a spindle with a record supporting notch in one side and an ejector lever swingable transversely across said notch comprising:

an integral molded one-piece body having an upright lower portion with first edges spaced to fit the holes in records to be played on the phonograph;

means defining a first slot formed in said one-piece body centrally of said first edges and sized to engage the front and sides of said spindle;

parallel inclined second edges on one side of said one-piece body extending from the top of said lower portion with said second edges being inclined toward said slot and terminating in spaced relation to said slot;

transversely spaced flanges on the front and back of said one-piece body extending from the upper ends of said second edges and thereabove and forming a laterally opening slot merging with the upper end of and constituting an extension of said first slot and sized to engage the front and back of said spindle;

said flanges having third edges extending laterally inwardly so as to define a support shelf intersecting said first slot, the third edges then being inclined outwardly above said support shelf;

inclined fourth edges on the side opposite said one side of said one-piece body extending parallel to said inclined second edges and to above said support shelf a distance slightly greater than the thickness of a record and spaced to fit the hole in the records;

a laterally outwardly and downwardly facing shoulder extending from the upper ends of said fourth edges;

oppositely inclined fifth edges extending from the outer edge of said shoulder parallel to said outwardly extending portions of said third edges;

a top on said one-piece body extending across the top of said laterally opening slot;

said one-piece body having recessed front and back sides leaving thin web-like portions surrounded by flanges forming said edges on said body; and said first slot being open on its back side and said means defining said first slot includes short upright flanges along the lower end of said first slot with said first slot being open on the back side of the one-piece body between said upright flanges.

5. A record holding adapter for a record changing phonograph having a spindle having a record support shelf and an ejector element for engaging the lowermost record at the support position of the spindle, comprising:

an integral molded one-piece body having an upright lower portion having an upwardly extending first sidewall having a first edge thereon;

said molded one-piece body having an intermediate portion extending upwardly from the upper end of said lower portion and having a second sidewall defining a second edge extending upwardly from the upper end of said first edge at an angle with respect to the vertical;

said molded one-piece body having an upper portion extending upwardly from the upper end of said intermediate portion and having third and fourth sidewalls respectively defining third and fourth edges which are spaced apart a distance so that they can be received within the central opening of a record having an enlarged central opening, there being defined a record support substantially at the intersection of said second and third edges with said record support being substantially in the horizontal plane containing said support shelf, and the lower end of said fourth edge being spaced upwardly from said record support a distance substantially equal to the thickness of a record;

said molded body having an upright passage therein for receiving said spindle, said passage opening at one side through said second and third sidewalls to the periphery of said adapter; and said upper portion of said molded one-piece body having a central web extending from adjacent the other side of said passage toward said fourth edge, said web having at the end thereof adjacent said opening spaced-apart wall means defining a vertical slot therein, with said slot communicating with said passage at the other side thereof, said vertical slot further being provided with a portion which tapers outwardly and downwardly for permitting slight vertical tilting of the adapter as it is slipped over the spindle.

References Cited

UNITED STATES PATENTS

| | | | |
|---|---|---|---|
| D. 205,724 | 9/1966 | Kelly | 274—10 |
| 2,884,255 | 4/1959 | Wennerbo et al. | 274—10 |
| 3,191,941 | 6/1965 | Krahulec | 274—10 |
| 3,191,942 | 6/1965 | Tatter | 274—10 |
| 3,245,689 | 4/1966 | Tatter et al. | 274—10 |
| 3,301,562 | 1/1967 | Tatter | 274—10 |

LEONARD FORMAN, *Primary Examiner.*

S. STEPHEN, *Assistant Examiner.*